United States Patent
Krishnan et al.

(10) Patent No.: US 11,341,749 B2
(45) Date of Patent: May 24, 2022

(54) SYSTEM AND METHOD TO IDENTIFY VISITORS AND PROVIDE CONTEXTUAL SERVICES

(71) Applicant: Avaya Inc., Basking Ridge, NJ (US)

(72) Inventors: Parameshwaran Krishnan, Basking Ridge, NJ (US); Avram Levi, Hoboken, NJ (US)

(73) Assignee: Avaya Inc., Basking Ridge, NJ (US)

( * ) Notice: Subject to any disclaimer, the term of this patent is extended or adjusted under 35 U.S.C. 154(b) by 981 days.

(21) Appl. No.: 13/630,105

(22) Filed: Sep. 28, 2012

(65) Prior Publication Data

US 2014/0092242 A1 Apr. 3, 2014

(51) Int. Cl.
*G06Q 30/00* (2012.01)
*G06V 20/52* (2022.01)
*H04N 7/18* (2006.01)

(52) U.S. Cl.
CPC ............. *G06V 20/52* (2022.01); *H04N 7/181* (2013.01)

(58) Field of Classification Search
CPC ........ H04N 7/181; G06Q 30/02; G06Q 10/20; G06K 9/007
USPC ........................................................ 348/143
See application file for complete search history.

(56) References Cited

U.S. PATENT DOCUMENTS

| | | | |
|---|---|---|---|
| 5,936,542 A | 8/1999 | Kleinrock et al. | |
| 6,657,543 B1 | 12/2003 | Chung | |
| 6,965,865 B2 * | 11/2005 | Pletz | G06Q 10/0631 705/346 |
| 7,066,383 B2 * | 6/2006 | Roth | G06F 7/00 235/375 |
| 7,212,655 B2 * | 5/2007 | Tumey | G06K 9/00087 340/5.2 |
| 7,353,182 B1 * | 4/2008 | Missinhoun | G06Q 10/0631 705/7.12 |
| 7,548,874 B2 * | 6/2009 | Kanevsky | G06Q 30/02 705/14.67 |
| 7,552,205 B2 * | 6/2009 | Lamb | G06Q 20/02 709/202 |
| 7,571,113 B2 * | 8/2009 | Fettig | G06Q 20/20 705/16 |

(Continued)

OTHER PUBLICATIONS

The Hill Group, "Podcasts", http://www.hillgroup.com/podcast. html, Retrieved Jun. 19, 2012, 3 pages.

*Primary Examiner* — Luis Perez-Fuentes

(57) ABSTRACT

System and method to provide contextual services, the method including: capturing a characteristic of a first person inside or within a predetermined distance of a monitored space; accessing a database of identifying characteristics of potential visitors to the monitored space; identifying the first person by use of the database, to produce an identified visitor; and providing to a second person an information related to the identified visitor. The system may include: a database of identifying characteristics of potential visitors to a monitored space; a surveillance device configured to capture a characteristic of a first person inside or within a predetermined distance of the monitored space; a processor configured to identify the first person by use of the database, to produce an identified visitor; and a communication interface configured to provide to a second person an information related to the identified visitor.

18 Claims, 3 Drawing Sheets

(56) References Cited

U.S. PATENT DOCUMENTS

| | | | | |
|---|---|---|---|---|
| 7,681,790 | B2* | 3/2010 | Birmingham | G06Q 10/087 235/383 |
| 7,739,201 | B2* | 6/2010 | Witmond | G06Q 10/083 705/330 |
| 7,761,591 | B2* | 7/2010 | Graham | G06Q 40/02 709/204 |
| 7,813,956 | B2* | 10/2010 | Doerwald | G06Q 30/02 705/14.36 |
| 7,908,175 | B2* | 3/2011 | Chang | G06Q 30/02 705/26.8 |
| 7,940,897 | B2* | 5/2011 | Khor | G06Q 30/02 379/88.02 |
| 8,019,819 | B2 | 9/2011 | Monteverde et al. | |
| 8,108,318 | B2* | 1/2012 | Mardikar | G06Q 20/1085 705/65 |
| 8,113,427 | B2* | 2/2012 | Ross | G01N 21/3581 235/378 |
| 8,131,023 | B2* | 3/2012 | Ishikawa | G06K 9/00979 348/207.1 |
| 8,191,783 | B2* | 6/2012 | Cheon | G06K 1/123 235/462.04 |
| 8,239,255 | B2* | 8/2012 | Ficalora | G06Q 30/0236 705/14.1 |
| 8,306,863 | B2* | 11/2012 | Biebesheimer | G06Q 30/02 705/26.1 |
| 8,353,451 | B2* | 1/2013 | Rothwell | G06Q 20/20 235/380 |
| 8,430,749 | B2* | 4/2013 | Nelson | G07F 17/32 463/29 |
| 8,600,830 | B2* | 12/2013 | Hoffberg | G06Q 30/0207 705/14.71 |
| 8,874,446 | B2* | 10/2014 | Carriere | G06Q 30/02 704/270.1 |
| 9,524,495 | B1* | 12/2016 | Hansen | G06Q 10/087 |
| 9,767,510 | B2* | 9/2017 | Altberg | G06Q 10/10 |
| 10,108,990 | B2* | 10/2018 | Rojahn | G06Q 10/10 |
| 2001/0041994 | A1 | 11/2001 | Kim | |
| 2007/0059674 | A1 | 3/2007 | Takano et al. | |
| 2010/0114941 | A1* | 5/2010 | Von Kaenel | G06F 16/29 707/769 |

* cited by examiner

100

200

300

SYSTEM AND METHOD TO IDENTIFY VISITORS AND PROVIDE CONTEXTUAL SERVICES

BACKGROUND

Field of the Invention

Embodiments of the present invention generally relate to an identification system, and, in particular, to a system and method for providing contextual information about, and/or service to, persons identified by the identification system.

Description of Related Art

Tradeshows are major sales and marketing events, and companies invest in these shows to make the best possible impression on customers, partners and analysts. Tradeshows have booths, stands, or the like in exposition areas and other special areas (e.g., innovation lounges where participation is by invitation only, etc.). At such events, many visitors arrive at a booth.

Booth staffers are sometimes provided profiles of some potential visitors (e.g., media representatives) in advance before a conference. They are expected to internalize the information. Booth staffers are expected to have a general idea of competitors, vendors, and partners.

Visitors are typically tracked at tradeshows via badges issued to registered tradeshow attendees. Passive radio frequency identification ("RFID") is a popular technology used to track badges and the visitors wearing the badges. The visitor badges are scanned from a few inches away using portable readers, usually with the visitor's permission. If a large company has multiple locations within a tradeshow floor, the scanning is ordinarily done just once or twice within the company's space rather than at each of the company's booths. For cost and logistical reasons, fixed RFID readers are seldom used.

A visitor profile typically is not communicated in real-time to the booth staffers. Booth staffers may try to glance at a visitor's badge or be introduced to the visitor when the visitor first arrives at the booth. Booth staffers may ask the visitor about their background and try to gauge an organizational importance and relevance of the visitor. Scanning the visitor's badge at every booth is possible, but may be intrusive and irritating to the visitor.

Therefore, a need exists to provide automatic visitor identification in a non-intrusive and cost-effective way, to provide near real-time feedback to the booth staffer, and to provide contextual services, in order to provide improved customer service, and ultimately improved customer satisfaction.

SUMMARY

Using voice and image to identify participants at a tradeshow in a non-invasive way provides quick feedback to booth staffers about characteristics of the visitor, and continuing feedback based on contextual analysis.

Instead of relying on scanning badges, our approach uses features that are naturally used by participants in tradeshows: namely, their voice and face. The method presented is non-intrusive, and mostly software based, with simple, inexpensive hardware to assist the process. It provides a method to alert booth staffers during or before a conversation with the participant, and by contextual analysis of speech, it can help alert booth staffers to exception conditions or opportunities.

In one embodiment, a method to provide contextual services includes: capturing a characteristic of a first person inside or within a predetermined distance of a monitored space; accessing a database of identifying characteristics of potential visitors to the monitored space; identifying the first person by use of the database, to produce an identified visitor; and providing to a second person an information related to the identified visitor.

In one embodiment, a system to provide contextual services includes: a database of identifying characteristics of potential visitors to a monitored space; a surveillance device configured to capture a characteristic of a first person inside or within a predetermined distance of the monitored space; a processor configured to identify the first person by use of the database, to produce an identified visitor; and a communication interface configured to provide to a second person an information related to the identified visitor.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
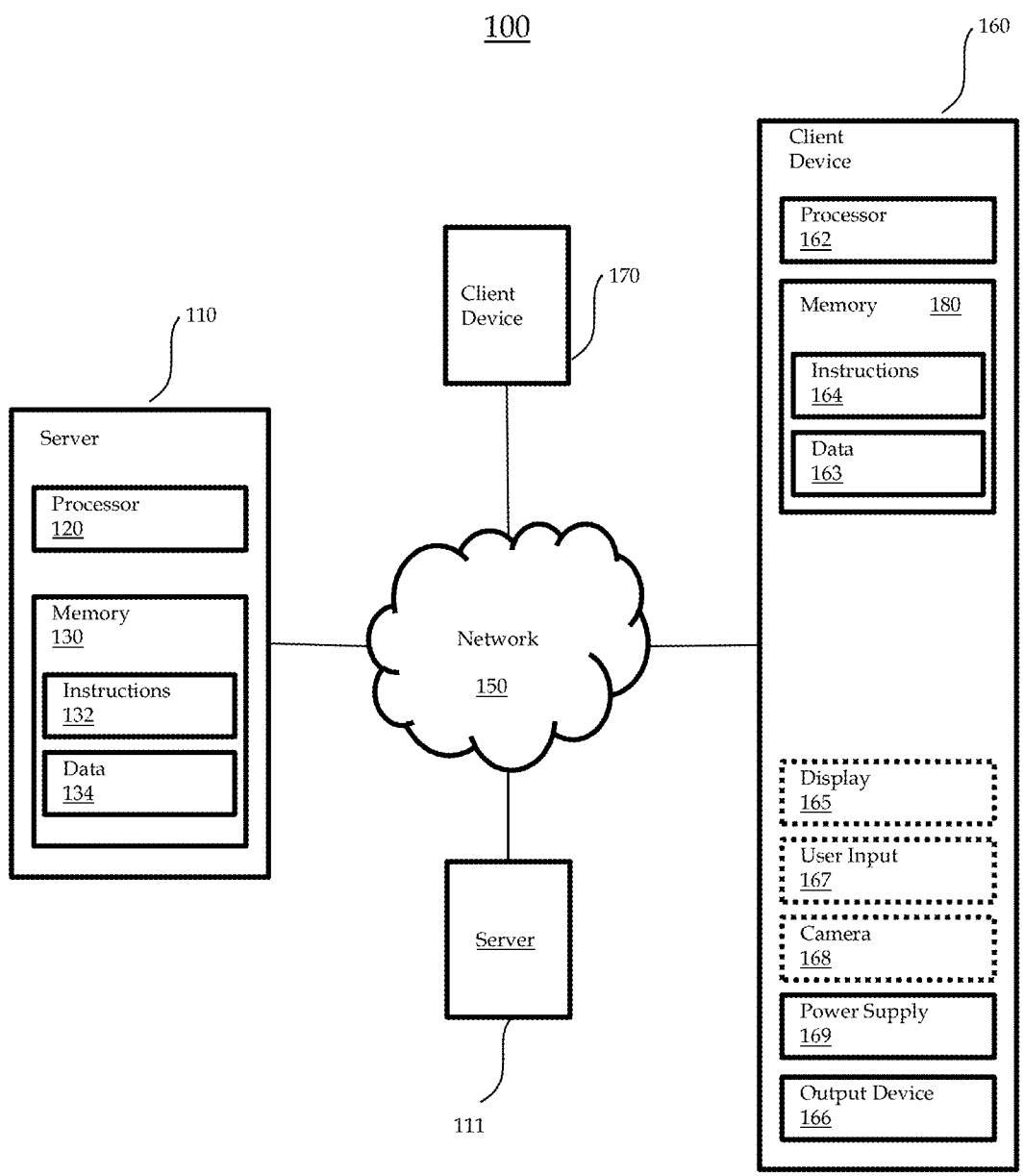
FIG. 1 illustrates a functional diagram of a system according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize visitor identification to provide contextualized services.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As shown in FIG. 1, a system 100 in accordance with one aspect of the present technology includes server 110 containing a processor 120, memory 130 and other components typically present in a communication device.

The server 110 may comprise one or more telecommunications devices that can provide data, video and/or audio services, such as, for example, a video server, a Private Branch Exchange (PBX), a switch, a web server, a security server, a key management server, or a network server or any other device capable of communicating data, bridging/mixing audio and/or video streams. Furthermore, server 110 may be at one node of a network 150 and may be capable of directly and indirectly receiving data from and sending data to other nodes of the network. For example, server 110 may be capable of receiving data from client device 160 via network 150 such that server 110 uses network 150 to transmit and display information to a user on display 165 of client device 170. Server 110 may also be operable to receive data from client device 160 via network 150 and transmit the data to one or more output devices such as, for example, speakers or one or more displays that are associated with server 110. Similarly, server 110 may, for example, comprise a web server that is capable of receiving data from a server 111 such that server 110 uses network 150 to transmit information to server 111. Differences in capability between different media devices (e.g., a camera whose resolution does not match a resolution of a viewing device) may be handled by use of techniques such as clipping, interpolation, decimation, codec conversions, etc.

Server 110 may also comprise a plurality of devices that exchange information with different nodes of a network for the purpose of receiving, processing and transmitting data to client devices. In this instance, the client devices will typically still be at different nodes of the network than any of the devices comprising server 110. Although server 110 is shown external to network 150, server 110 may be part of network 150.

System 100 may include a policy server that manages keys, document security level and can influence how the data is organized on client device 160. The policy server may also include a component that monitors the location of client device 160. The policy server may be integrated within server 110, or may be implemented as a separate server (not shown in FIG. 1) in communication contact with server 110 and client device 160 through network 150.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, solid-state drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as any commercially available CPU. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors, computers or memories that may or may not operate in parallel.

Network 150 may be any telecommunications network such as, for example, the Internet, a Wide Area Network (WAN), a Local Area Network (LAN), the Public Switched Telephone Network (PSTN), Bluetooth, Near Field Communication (NFC), WiFi, a cellular network, and an Integrated Digital Services Network (ISDN). Furthermore, network 150 may include one or more telecommunications networks with various configurations and may use various protocols such as, for example, VoIP, TCP/IP, proprietary protocols, instant messaging, HTTP and SMTP, and various combinations of the foregoing. Although only a few computers are depicted in FIGS. 1-2, it should be appreciated that a typical system can include a large number of connected computers.

Each client device 160 or 170 may be any type of telecommunications device that can output a video and/or audio stream, such as, for example, an audio and/or video surveillance system, a telephone, a cellular telephone, a Bluetooth earpiece, a Personal Computer (PC), a Personal Digital Assistant (PDA), a tablet computer, a monitor, a television, or a conference room video system. Furthermore, each client device may be configured similarly to server 110, as described above, and may include various components such as, for example, a central processing unit (CPU) 162, memory 180 (e.g., RAM and internal hard drives) storing data 163 and instructions 164, an electronic display 165 (e.g., a monitor having a screen, a touch-screen, a projector, a television, a computer printer or any other electrical device that is operable to display information), output devices 166 (e.g., speaker, headset, headset connector), user input 167 (e.g., a mouse, keyboard, touch-screen or microphone), a camera 168, a power supply 169 (e.g., battery, AC adaptor connector, solar cell, or other power source), a network interface device, and all of the components used for connecting these elements to one another. Although shown as a single device, client devices 160 or 170 may be distributed between multiple devices. For example, client device 160 may be distributed between a telephone and a personal computer.

In addition to the operations described below and illustrated in the figures, various operations in accordance with aspects of the present technology will now be described. It should also be understood that the following operations do not have to be performed in the precise order described below. Rather, various steps can be handled in a different order or simultaneously. Steps may also be removed or added.

Figure 2:
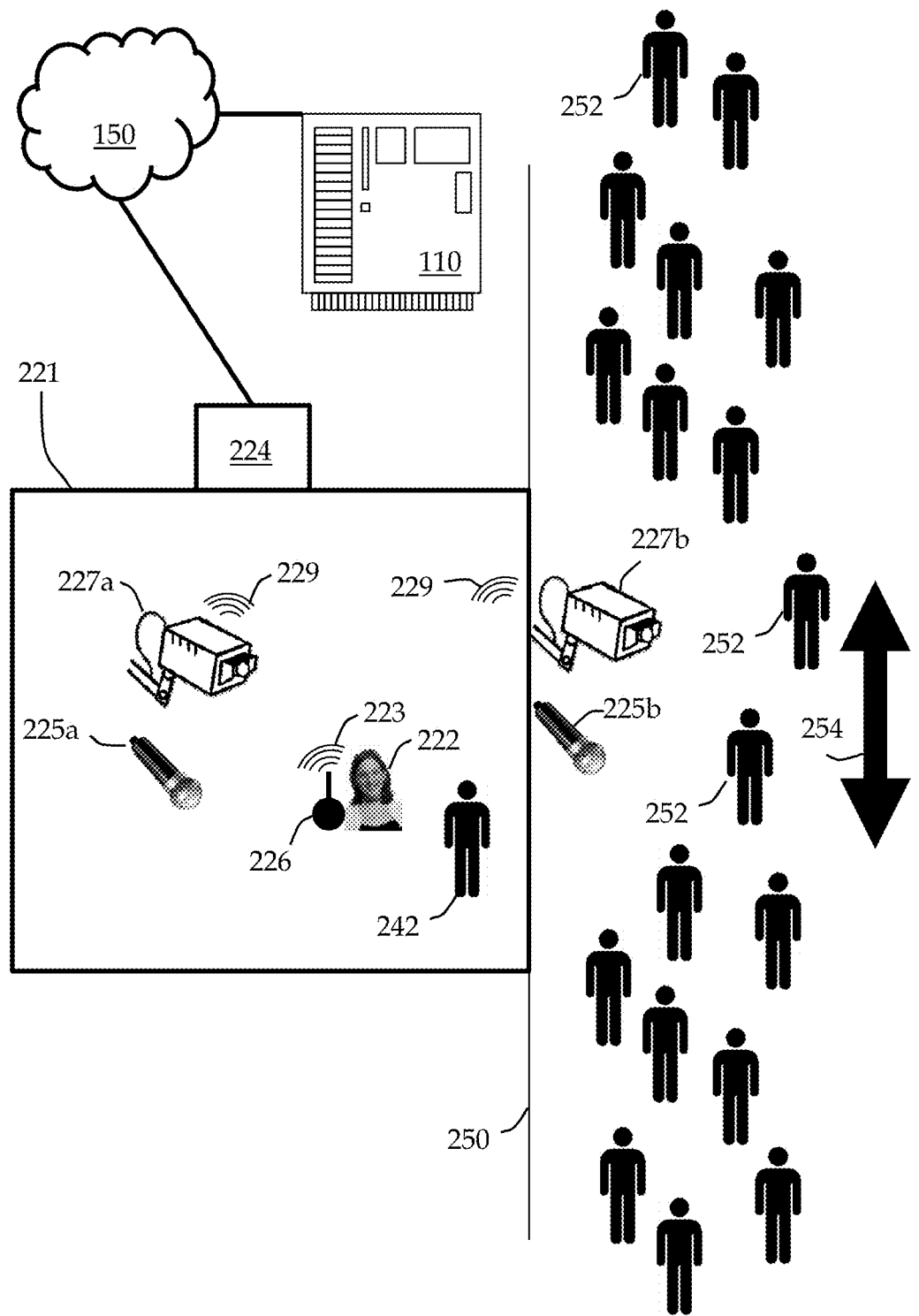
FIG. 2 illustrates at a high level of abstraction a pictorial diagram of the usage of the system of FIG. 1, in accordance with an embodiment of the present invention.

FIG. 2 illustrates at a high level of abstraction an embodiment 200 of system 100, in accordance with an embodiment of the invention. Embodiment 200 illustrates an event at a physical space 221. Physical space 221 is depicted as a trade show, but embodiments in accordance with the present invention may be used with other types of gatherings, such as a symposium, a lecture, a retail store, a shopping mall, or other group of people.

In other embodiments, physical space 221 may represent more than one location. For instance, physical space 221 may represent a plurality of booths at a convention or a plurality of stores in a shopping mall or a plurality of presentation rooms at a symposium, some of which may not necessarily be physically adjacent.

Physical space 221 is populated by one or more persons 222 who are stationed at the event, such as booth workers at a trade show, or invited guests at a symposium, etc. As persons 222 and/or visitors 242 move around at physical space 221, their movements may be tracked by a video surveillance device 227a (e.g., a video camera) and/or an audio surveillance device 225a (e.g., a microphone). Within physical space 221 there may be one or more visitors 242 who may engage or attempt to engage in conversation with persons 222, or persons 222 who may engage or attempt to engage in conversation with visitors 242. Although persons 222 and visitors 242 may move around within physical space 221, they do not generally use physical space 221 as a passageway to go directly from one area to another, without at least lingering for a period of time within physical space 221.

Person 222 may carry a communication device 226 (e.g., transceiver, mobile phone, etc.) that communicates, via a communication interface 223, with a network interface 224 and further to a server 110 through network 150. Transceiver 226 may include an earpiece in order to support a voice communication channel to person 222. Server 110 may be configured to support contextual services as described herein.

Communication interface 223 is depicted as a wireless interface in order to improve mobility of persons 222 within physical space 221. Communication interface 223 supports the voice communication channel to person 222. However, other interfaces such as a wired interface may be used, for instance if persons 222 are relatively immobile such as at a panel discussion or poster session at a symposium.

Outside of physical space 221, but passing nearby may be a passageway 250 (e.g., aisle, corridor, or the like), through which may pass one or more persons 252. Persons 252 generally go back and forth within passageway 250, as indicated by arrow 254. Some of persons 252 may enter into physical space 221 and thereby become a visitor 242. Passageway 250 may be monitored by a video surveillance device 227b and/or an audio surveillance device 225b. Surveillance devices 225a-b and 227a-b may communicate, via a communication interface 229, with a network interface 224 and further to a server 110 through network 150, and in at least this sense act as client devices 160.

Tradeshow interactions often begin with voice and/or face-to-face conversations. Therefore, embodiments in accordance with the present invention use voice and/or facial recognition to provide visitor identification and to provide contextual services.

Contextual services provide an ability for a booth staffer to know the identity or affiliation of visitors to a booth or special area and to know other attributes of the visitors (e.g., whether the visitor is an important decision maker, competitor, regular visitor, possible partner, vendor, and so forth). Any prior proprietary information that the company staffing the booth may have collected on the visitor or on the company that the visitor is affiliated with may also be useful to have. Contextual information may also include how the company views a particular visitor, what particular information would the company be willing to disclose to the visitor, whether there are ongoing business negotiations and if so the amount of compromise that could be offered to the visitor, what kind of relationship does the visitor have to the company, the visitor's business needs in general (e.g., if a product could be used for two use cases, which one would the visitor be more interested in), and so forth. Continuous but subtle feedback, warnings or the like to the booth staffer based on discussions with the visitor would also be advantageous. Discussions with the visitors may be guided by the information. For example, a high-value potential customer may receive lavish attention and candor, while a warning may be useful so that the booth staffer is less candid in order to reduce a likelihood that sensitive information may be discussed with a competitor. Embodiments in accordance with the present invention provide a cost-effective and non-intrusive way to provide such information, feedback, warnings or the like.

Contextual information may also be useful for a booth worker 222 who is interacting with multiple visitors 242 and with the contextual information being derived from multiple people within the audible vicinity of the interaction.

A system in accordance with an embodiment of the present invention may include five main components:

First, a database of expected visitors may be pre-populated with tags identifying certain predetermined information such as features, descriptions and classifications. The information in the tags may include such components as: role (e.g., decision maker, advisor, technical, etc.), type of business (e.g., call center, networking, etc.), expected interests (e.g., new products, marketing, etc.), known hobbies, size of company, influence, and the like. The information may have been gathered from a variety of sources, such as public information, business intelligence, government regulatory filings, mined from social media, etc. At least some of this information may also be available from specialized organizations that either collect it on their own or subscribe to databases that provide this information. The database of expected visitors may be based on conference registrations appended with information from other databases.

Second, embodiments in accordance with the present invention may include an apparatus that can gather information from the visitor in order to identify the visitor. In one embodiment, the apparatus may include an RFID reader configured to read an RFID tag associated with the visitor's badge. In another embodiment, the apparatus may include a module configured to analyze a voiceprint sample and/or a picture. The voiceprint sample and/or picture may be obtained during, e.g., conference registration. For example, during registration or collection of information for badging, when a visitor typically provides their company affiliation, embodiments in accordance with the present invention may be configured in addition to request that the visitor read some predetermined text (e.g., a sentence or two shown on the screen), which will be recorded as a voiceprint sample. A photograph may also be taken. The voiceprint sample and/or photograph may be made available by the conference organizers to the companies hosting booths in the tradeshow, perhaps for a fee. Usage of the surveillance devices (audio, visual, RFID) may be controlled by a configurable policy. The configurable policy allows a human system manager to control and change a balance between identification and privacy concerns.

Third, embodiments in accordance with the present invention may include an audio and/or video surveillance device in or near the booth, which scans for audio matching the stored voiceprints and/or video matching the stored photographs. Audio surveillance (e.g., microphones) may be sufficiently directional, or incorporate signal processing software to preferentially pick up voices of people near to or approaching the booth over background noise, in order to reduce the effect of background noise, yet have a broad-enough sensitivity pattern in order to effectively gather voice samples of persons approaching the booth or at the booth. Video surveillance may also be sufficiently directional, or be of sufficiently high video resolution, in order to apply known facial recognition techniques to video of persons approaching the booth at the booth.

A visitor is more likely to be speaking, or to be near enough in order to provide a usable video image, if the visitor is engaging or trying to engage a booth staffer either at the booth or close to it. Consequently, in some embodiments, the surveillance device may be tuned to one or more known workers at the booth or special area, e.g., by detecting the booth worker and then following around the booth worker with the surveillance device or adjusting the zoom, field of view, sensitivity, pattern coverage, or the like, in order to particularly monitor a space surrounding the detected booth staffer. The monitored space may include, for example, a predetermined spatial distance in front of the booth staffer (e.g., within 3 feet) and/or within a predetermined +/− angle in front of the booth staffer (e.g., +/−85 degrees). A visitor conversing or attempting to converse with the booth staffer, or with another visitor listening to the booth staffer, is likely to be within the booth staffer's field of view and/or direction of vocal projection, and to be near enough to hear the booth staffer in a potentially noisy environment. Once the space to particularly monitor is determined, then the surveillance device may be operated to identify other persons within the particularly monitored space.

Fourth, embodiments in accordance with the present invention may include an analysis engine (i.e., a processor) that analyzes the signature and matches it to the set of signatures in the available database. A signature, as used herein, refers to identifying audio and/or visual cues that embodiments in accordance with the present invention may use to identify a specific person. Visual cues may include photos or video that may be used for recognizing appearance or facial expression, and video that may be used for recognizing motion, gestures, and the like. The analysis engine may continue analyzing the detected audio and/or video in order to provide additional contextual services as described below.

Fifth, embodiments in accordance with the present invention may include an information delivery apparatus to provide relevant information swiftly and succinctly to the booth staffer. The information delivery apparatus and a method to use it may take several forms. The visitor's profile can be downloaded onto a screen viewable by the booth staffer during or before the meeting with the visitor. Alternatively, a visual or audio feedback can be provided to the booth staffer. The feedback could be a color code or number for the "value" of the visitor shown, e.g., on the staffer's mobile. Value may be determined in a business sense (e.g., ability to make high dollar amounts of purchases) based upon business intelligence and analysis provided by the analysis engine. A tactile alert (e.g., vibration on a mobile phone) can alert the staffer to pending information on the mobile phone. The staffer may also be provided with a discreet, unobtrusive earpiece (e.g., a Bluetooth device) in which specific suggestions can be provided from the information delivery apparatus.

Figure 3:
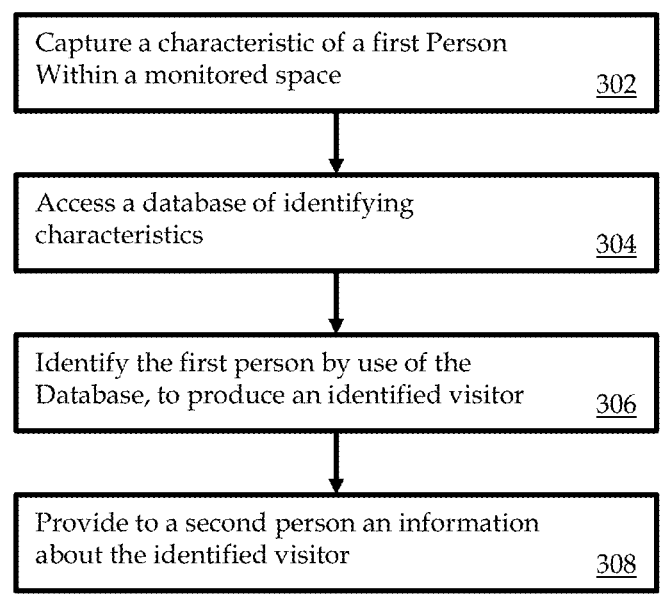
FIG. 3 illustrates typical steps taken during usage of the system of FIG. 1, in accordance with an embodiment of the present invention.

FIG. 3 illustrates a method 300 in accordance with an embodiment of the present invention. In method 300, a database is pre-populated with available audio and visual identifiers of possible visitors, and linked (i.e., associated with) the corresponding person. At step 302, a surveillance device in or near the booth (e.g., microphone, video camera, etc.) captures voice and image fragments.

At step 304, a database of identifying characteristics is accessed. For example, the database may include one or more of a voiceprint, picture, RFID tag number, etc. of possible visitors, such as registrants in an exhibition.

At step 306, an analysis engine, in real-time, analyzes the sound and processes the images. The analysis engine may make use of the observation that typical phrases often signal a start of a conversation (e.g., "Hello" or "what are you interested in"). The analysis engine may try to capture the name of the participant during this initial exchange, particularly if the booth staffer is trained to elicit this information during the initial conversation. The analysis engine may also collect the voice samples and match them to the voiceprint in the database. Speaker recognition algorithms are known which use characteristics like pitch, tone, frequency etc. in order to match a voice sample to a voice print. The identification of visitors may be further narrowed based on other criterion, such as tracking technology to track participants on the tradeshow floor, location and time of the last time a visitor's badge was scanned, and so forth.

At step 308, once a participant has been reliably determined, relevant information can be provided to the booth staffer using the information delivery apparatus described above. The information can be provided during the conversation, or in anticipation, such as a booth staffer at a nearby booth when a visitor is recognized at another booth.

Even after participant recognition, an ensuing conversation may be analyzed by the analysis engine for typical and contextual patterns. The analysis could be entirely automated, or may be escalated to a human supervisor during or after an initial match. Real-time review may offer several benefits. For example, supervisory review may determine whether booth staffers may be providing too much information, and may provide a real-time warning if the supervisory review is conducted in real-time. A booth staffer may be alerted if a visitor is asking unusual questions. A supervisor or expert may be able to guide the booth staffer's discussion with the visitor. Other tradeshow representatives may also be alerted to assist the booth staffer. Business offers may be made to the participant based on the analysis.

In some embodiments in accordance with the present invention, a person 222 such as a booth attendant or other company representative may be notified of visitors 242 (e.g., potential prospects) and may be directed to engage visitors 242 if visitors 242 are not at within the booth but may be nearby such as in an adjacent aisle or if closer to a neighboring booth. The person 222 may be asked to observe or find predetermined persons if provided an approximate location from a tracking module. The selection of such persons to observe or find may be based on past information or analyzing current/past conversations. Other people on a tradeshow floor (e.g., VP of Sales) may be notified to approach a booth if the conversation at the booth seems to be of value.

Embodiments of the present invention include a system having one or more processing units coupled to one or more memories. The one or more memories may be configured to store software that, when executed by the one or more processing unit, allows practicing embodiments of the invention described herein, including at least in FIGS. 2-3 and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

What is claimed is:

1. A method to provide contextual services, the method comprising:
   capturing, by a surveillance device, a potentially identifying characteristic of a first person within a predetermined distance of a monitored space, wherein the monitored space corresponds to a location of a second person affiliated with an enterprise;
   matching, by an analysis engine, using at least one recognition algorithm, the potentially identifying characteristic with at least one of a plurality of different identifying characteristics stored in a database, the database comprising at least one respective identifying characteristic for each of a plurality of potential visitors to the monitored space;
   identifying, by the analysis engine, an identity of the first person based on the potentially identifying characteristic matching one of the respective identifying characteristics in the database, to produce an identified visitor;
   based on the identity of the identified visitor, providing, to a communication device associated with the second person, contextual information related to the identified visitor;
   capturing, by the surveillance device, aspects of a conversation between the second person and the identified visitor;
   based on the identity of the identified visitor and the contextual information, analyzing, by the analysis engine, the captured aspects of the conversation; and
   providing, to the communication device associated with the second person, based on analysis of the captured aspects of the conversation by the analysis engine, real-time guidance for conducting the conversation, wherein the real-time guidance comprises at least one of visual or audio feedback.

2. The method of claim 1, wherein the monitored space comprises a passageway and an adjacent area not used as a passageway.

3. The method of claim 1, wherein the contextual information related to the identified visitor comprises an expected interest of the identified visitor.

4. The method of claim 1, wherein the real-time guidance comprises one or more of a warning to be less candid or a color code associated with the identified visitor.

5. The method of claim 1, wherein capturing the potentially identifying characteristic of the first person comprises capturing a voiceprint.

6. The method of claim 1, wherein capturing the potentially identifying characteristic of the first person comprises capturing an image.

7. The method of claim 1, wherein capturing the potentially identifying characteristic of the first person comprises capturing a radio-frequency identification (RFID) identifier.

8. The method of claim 1, wherein capturing the potentially identifying characteristic of the first person is controlled by a configurable policy that is based, at least in part, on privacy concerns.

9. The method of claim 1, wherein capturing the potentially identifying characteristic is performed when the first person is within a predetermined distance and angle from the second person.

10. A system to provide contextual services, the system comprising;
    a database storing a plurality of different identifying characteristics comprising at least one respective identifying characteristic for each of a plurality of potential visitors to a monitored space;
    a memory storing executable instructions;
    a processor in communication with the memory, wherein the executable instructions when executed by the processor cause the processor to:
       receive, from a surveillance device, a potentially identifying characteristic of a first person, the surveillance device configured to capture the potentially identifying characteristic of the first person within a predetermined distance of the monitored space, wherein the monitored space corresponds to a location of a second person affiliated with an enterprise;
       match, by an analysis engine of the system, using at least one recognition algorithm, the potentially identifying characteristic with at least one of the plurality of different identifying characteristics;
       identify, by the analysis engine, an identity of the first person based on the potentially identifying characteristic matching one of the respective identifying characteristics, to produce an identified visitor;
       based on the identity of the identified visitor, transmit, to a communication device associated with the second person, contextual information related to the identified visitor;
       receive, from the surveillance device, aspects of a conversation between the second person and the identified visitor;
       based on the identity of the identified visitor and the contextual information, analyze, by the analysis engine, the captured aspects of the conversation; and
       transmit, to the communication device associated with the second person, based on analysis of the captured aspects of the conversation by the analysis engine, real-time guidance for conducting the conversation, wherein the real-time guidance comprises at least one of visual or audio feedback.

11. The system of claim 10, wherein the contextual information related to the identified visitor comprises an expected interest of the identified visitor.

12. The system of claim 10, wherein the real-time guidance comprises one or more of a warning to be less candid or a color code associated with the identified visitor.

13. The system of claim 10, wherein operation of the surveillance device is controlled by a configurable policy that is based, at least in part, on privacy concerns.

14. The system of claim 10, wherein the potentially identifying characteristic of a first person is received when the first person is within a predetermined distance and angle from the second person.

15. The system of claim 10, wherein the surveillance device comprises a radio-frequency identification (RFID) detector.

16. The method of claim 1, wherein the contextual information related to the identified visitor comprises at least one of an organizational affiliation of the identified visitor or a role of the identified visitor.

17. The system of claim 10, wherein the contextual information related to the identified visitor comprises at least one of an organizational affiliation of the identified visitor or a role of the identified visitor.

18. The system of claim 10, wherein the potentially identifying characteristic of the first person comprises at least one of a voiceprint, an image, or a radio-frequency identification (RFID) identifier.

\* \* \* \* \*